Figure 1:
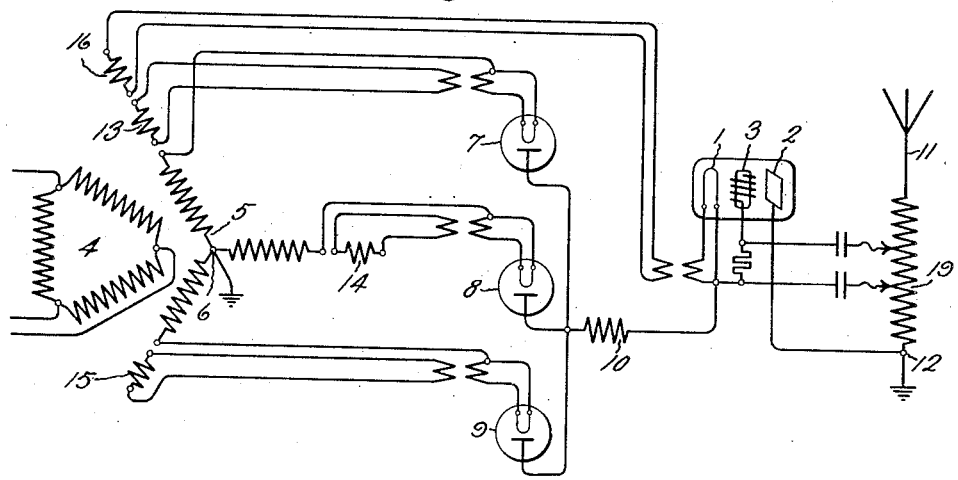

Dec. 14, 1926.

W. C. WHITE 1,610,837

RECTIFIER CIRCUITS

Filed March 6, 1923

2 Sheets-Sheet 1

Inventor:
William C. White.

Dec. 14, 1926.

W. C. WHITE 1,610,837

RECTIFIER CIRCUITS

Filed March 6, 1923

2 Sheets-Sheet 2

Fig. 3.

Inventor:
William C. White

Patented Dec. 14, 1926.

1,610,837

UNITED STATES PATENT OFFICE.

WILLIAM C. WHITE, OF SCHENECTADY, NEW YORK, ASSIGNOR TO GENERAL ELECTRIC COMPANY, A CORPORATION OF NEW YORK.

RECTIFIER CIRCUITS.

Application filed March 6, 1923. Serial No. 623,279.

My present invention relates to circuit connections for producing unidirectional current from polyphase alternating current.

One of the objects of my invention is to provide a simple and convenient circuit connection for obtaining direct current from polyphase alternating current by the use of rectifiers which will avoid certain disadvantages which are present in rectifying systems which have been previously employed.

It has been customary in the past when employing rectifiers for converting polyphase alternating current into direct current to connect the cathodes of the several rectifiers employed, to one side of the circuit to which direct current is to be supplied and connect the other side of the circuit to a neutral point in the secondary winding of the supply transformer. The anodes of the rectifiers are connected to the terminals of the secondary windings which are normally at different potentials. When a circuit connection of this type is employed for supplying current for the operation of certain types of consumption devices such as electron discharge devices, the cathodes of these devices must be connected to the side of the circuit which is connected to the neutral point of the transformer secondary which may be grounded, and the anodes must be connected to the cathodes of the rectifiers which are operated at a potential much higher than ground potential. In case the electron discharge consumption device is one having a metal anode which requires cooling in its operation, this arrangement presents the disadvantage that the cooling apparatus for the anode must be thoroughly insulated from the ground.

A further object of my invention is to provide an arrangement which will avoid this disadvantage and permit the operation of the anodes of the electron discharge consumption devices at ground potential.

In carrying my invention into effect I preferably provide individual rectifiers for each phase of the alternating current and connect the cathodes of the individual rectifiers to points in the secondary winding of the transformer which are normally at different potentials. The anodes of the rectifiers are all connected together and to one side of the consumption circuit, and a neutral point in the secondary winding of the transformer is connected to the other side of the consumption circuit. When electron discharge devices are supplied with current from the rectifier system arranged in this way, the cathodes of these devices will be connected to that side of the supply circuit which is connected to the anodes of the rectifiers and the anodes of the consumption devices will be connected to that side of the supply circuit which is connected to the neutral point of the transformer secondary which may be grounded.

In case thermionic rectifiers are employed the insulation of the system is also simplified by supplying current for heating the filaments of the individual rectifiers from that phase of the transformer secondary to which the cathode of the rectifier is connected.

Figure 2:
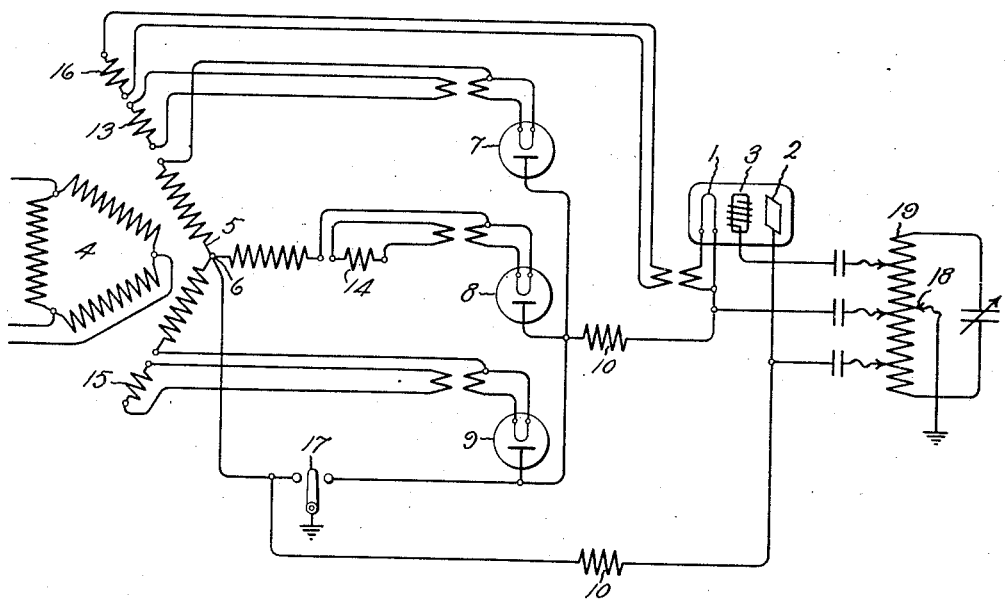

The novel features which I believe to be characteristic of my invention are set forth with particularity in the appended claims; my invention itself however will best be understood by reference to the following description taken in connection with the accompanying drawing in which Figs. 1, 2 and 3 indicate diagrammatically three different circuit connections which may be employed to advantage in carrying my invention into effect.

In Fig. 1, I have indicated a system for supplying direct current for the operation of an alternating current generator of the thermionic type consisting of the usual thermionic cathode 1, anode 2, and discharge controlling member 3. Current for the operation of this device is derived from an alternating current source comprising a three-phase transformer having a delta connected primary 4 and a Y connected secondary 5. The neutral point 6 in the secondary winding may be grounded and the high tension terminals connected to the cathodes of individual thermionic rectifiers 7, 8 and 9. The anodes of these rectifiers are all connected together and connected through a combination radio frequency choke and smoothing inductance 10 to the cathode 1 of the generating device. This device is arranged to produce oscillations in the antenna 11 in the well known manner and the anode 2 is connected at 12 to the ground connection of the antenna. The anode 2 being at ground potential it is possible to use water cooling of the anode without any necessity of insulating the apparatus by means of which cooling water is supplied. Since the anodes of rectifiers 7, 8 and 9 are all at the same potential, a common cooling system may be provided for cooling the anodes of all of the rectifiers, if desired. Individual transformer windings 13, 14 and 15 may be provided for supplying heating current to the cathodes of the rectifiers 7, 8 and 9. These transformer windings may be combined with the high tension bushing of the transformer terminal and the insulation thereof thus simplified. An additional secondary winding 16 may also be provided for supplying heating current to the cathode 1 of the consumption device.

In Fig. 2, I have shown a slight modification of my invention in which a switch 17 is provided by means of which it is possible to ground either the neutral point of the secondary windings of the supply transformer or the anodes of the rectifiers. The ground connection 18 to the oscillating circuit of the thermionic oscillation generator may be connected to either end of the inductance 19 or an intermediate point.

In Fig. 3, I have shown a modification which may be used to advantage for reducing the ripples in the rectified current. In this case two Y-connected secondaries 20, 21 are employed with individual rectifiers for each phase of each secondary winding and the neutral points 22, 23 of these secondary windings are connected together through an interphase transformer 24 which assists in smoothing out the ripples in the rectified current. The anodes of the six rectifiers employed are all connected together and to one side of the circuit to which rectified current is to be supplied, the other side of this circuit being connected to the interphase transformer 24.

While I have shown and described the preferred embodiments of my invention, it will be apparent that many modifications in the circuit arrangements employed as well as in the specific form of apparatus used, may be made without departing from the scope of my invention as set forth in the appended claims.

What I claim as new and desire to secure by Letters Patent of the United States, is:

1. The combination in a rectifying system of a plurality of rectifiers, each having an electron emitting cathode and an anode, an alternating current transformer having a plurality of secondary windings, connections from the cathodes of said rectifiers to points in said secondary windings which are normally at different potentials, an electron discharge device provided with a cathode connected to the anodes of said rectifiers and with an anode connected to ground, and a ground connection to a neutral point in the secondary circuit of said transformer.

2. The combination in a rectifying system of a plurality of rectifiers, each having a thermionic cathode and an anode, a polyphase transformer, each of the secondary windings of which has one terminal connected directly to a circuit for supplying unidirectional current and the other terminal connected to the cathode of one of said rectifiers, the anodes of all of said rectifiers being connected together and connected directly to said circuit, and means for supplying heating current to the cathode of each rectifier from the secondary phase of the transformer to which it is connected.

3. The combination in a system of distribution of a plurality of rectifiers, each having an electron emitting cathode and an anode, a polyphase transformer, each of the secondary windings of which has one terminal connected to the cathode of an individual rectifier, an electron discharge device provided with a cathode connected to the anodes of said rectifiers and with an anode connected to ground, and a ground connection to a terminal of each of said secondary windings.

4. The combination in a system of distribution of a plurality of rectifiers, each having an electron emitting cathode and an anode, a polyphase transformer, each of the secondary windings of which has one terminal connected to the cathode of an individual rectifier, a consumption device provided with a cathode connected to the anodes of said rectifiers and with an anode connected to ground, and a ground connection to a terminal of each of said secondary windings.

5. The combination in a system of distribution of a plurality of rectifiers, each having an electron emitting cathode and an anode, a three-phase transformer, each of the secondary windings of which has one terminal connected to the cathode of an individual rectifier, a thermionic consumption device provided with a cathode connected to the anodes of said rectifiers and with an anode connected to ground, and a ground connection to a terminal of each of said secondary windings.

6. The combination in a rectifying system of a plurality of rectifiers, each having a thermionic cathode and an anode, a three-phase transformer, each of the secondary windings of which has one terminal connected directly to a circuit for supplying unidirectional current and the other terminal connected to the cathode of one of said rectifiers, the anodes of all of said rectifiers being connected together and connected directly to said circuit, and means for supplying heating current to the cathode of each rectifier from the secondary phase of the transformer to which it is connected.

In witness whereof, I have hereunto set my hand this 5th day of March, 1923.

WILLIAM C. WHITE.